United States Patent
Taherzadeh Boroujeni et al.

(10) Patent No.: US 11,722,911 B2
(45) Date of Patent: Aug. 8, 2023

(54) COVERAGE ENHANCEMENT INDICATION VIA WAKE-UP SIGNALING

(71) Applicant: QUALCOMM Incorporated, San Diego, CA (US)

(72) Inventors: Mahmoud Taherzadeh Boroujeni, San Diego, CA (US); Xiaoxia Zhang, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 34 days.

(21) Appl. No.: 17/308,681

(22) Filed: May 5, 2021

(65) Prior Publication Data
US 2022/0030439 A1    Jan. 27, 2022

Related U.S. Application Data

(60) Provisional application No. 63/055,748, filed on Jul. 23, 2020.

(51) Int. Cl.
*H04W 16/26* (2009.01)
*H04W 76/28* (2018.01)
(Continued)

(52) U.S. Cl.
CPC ........... *H04W 16/26* (2013.01); *H04W 16/28* (2013.01); *H04W 52/0229* (2013.01); *H04W 76/28* (2018.02)

(58) Field of Classification Search
CPC ..... H04W 16/26; H04W 76/28; H04W 16/28; H04W 52/0229
(Continued)

(56) References Cited

U.S. PATENT DOCUMENTS

| | | | |
|---|---|---|---|
| 10,750,417 B2* | 8/2020 | Futaki | H04W 36/04 |
| 2016/0309398 A1* | 10/2016 | Xue | H04W 68/00 |
| 2020/0205075 A1* | 6/2020 | Nam | H04W 52/0216 |

FOREIGN PATENT DOCUMENTS

| | | |
|---|---|---|
| WO | 2019137158 A1 | 7/2019 |
| WO | 2020033618 A1 | 2/2020 |

OTHER PUBLICATIONS

Huawei: "Corrections for Power Saving", 3GPP Draft, R1-2005132, 3GPP TSG-RAN WG1 Meeting #100-e, 3rd Generation Partnership Project (3GPP), Mobile Competence Centre, 650, Route Des Lucioles, F-06921 Sophia-Antipolis Cedex, France, vol. RAN WG1. no. E-meeting, May 25, 2020-Jun. 5, 2020, Jun. 23, 2020 (Jun. 23, 2020), XP051904334, 4 Pages, Retrieved from the Internet: URL:https://ftp.3gpp.org/tsg_ran/TSG_RAN/TSGR_88e/Docs/RP-200693.zip 38212_CR0039r1_(Rel-16)_R1-2005132.docx [retrieved on Jun. 23, 2020] paragraph [7.3.1.3.7].

(Continued)

*Primary Examiner* — Nghi H Ly
(74) *Attorney, Agent, or Firm* — Patterson + Sheridan, LLP

(57) ABSTRACT

Certain aspects of the present disclosure provide techniques for coverage enhancement information indication via wake-up signaling. An example method generally includes obtaining a message, the message including: a first field including at least one wake-up indication bit associated with a user equipment (UE) and a second field including coverage information associated with at least one downlink channel. The method may also include monitoring for the at least one downlink channel based, at least in part, on the message.

30 Claims, 11 Drawing Sheets

(51) Int. Cl.
*H04W 52/02* (2009.01)
*H04W 16/28* (2009.01)

(58) Field of Classification Search
USPC ............... 370/350, 329, 328, 338, 341, 345
See application file for complete search history.

(56) References Cited

OTHER PUBLICATIONS

International Search Report and Written Opinion—PCT/US2021/037266—ISA/EPO—dated Sep. 28, 2021.
Samsung: "Corrections on UE Power Savings", 3GPP Draft, R1-2005141, 3GPP TSG-RAN WG1 Meeting #101-e, 3rd Generation Partnership Project (3GPP), Mobile Competence Centre, 650, Route Des Lucioles, F-06921 Sophia-Antipolis Cedex, France, vol. RAN WG1, no. e-Meeting, May 25, 2020-Jun. 5, 2020, Jun. 23, 2020 (Jun. 23, 2020), XP051904335, 6 Pages, Retrieved from the Internet: URL:https://ftp.3gpp.org/tsg_ran/TSG_RAN/TSGR_88e/Docs/RP-200693.zip 38213_CR0105r1_(Rel-16)_R1-2005141. docx [retrieved on Jun. 23, 2020] paragraph [10.3].

* cited by examiner

COVERAGE ENHANCEMENT INDICATION VIA WAKE-UP SIGNALING

CROSS REFERENCE TO RELATED APPLICATION

This Application hereby claims priority under 35 U.S.C. § 119 to pending U.S. Provisional Patent Application No. 63/055,748, filed on Jul. 23, 2020, the contents of which are incorporated herein in their entirety

FIELD OF THE DISCLOSURE

Aspects of the present disclosure relate to wireless communications, and more particularly, to techniques for coverage enhancement information indication via wake-up signaling.

DESCRIPTION OF RELATED ART

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication nodes, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., which may be referred to as a base station, 5G NB, next generation NodeB (gNB or gNodeB), TRP, etc.). A base station or distributed unit may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless nodes (e.g., BSs and/or UEs) to communicate on a municipal, national, regional, and even global level. New Radio (NR) (e.g., 5G) is an example of an emerging telecommunication standard. NR is a set of enhancements to the LTE mobile standard promulgated by 3GPP. It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved coverage enhancement indication when operating in a connected discontinuous reception (CDRX) mode.

Certain aspects provide a method for wireless communications by a user equipment (UE). The method generally includes obtaining a message, the message including: a first field including at least one wake-up indication bit associated with a user equipment (UE) and a second field including coverage information associated with at least one downlink channel. The method may also include monitoring for the at least one downlink channel based, at least in part, on the message.

Certain aspects provide an apparatus for wireless communications by a user equipment (UE). The apparatus generally includes an interface configured to obtain a message, the message including: a first field including at least one wake-up indication bit associated with a user equipment (UE) and a second field including coverage information associated with at least one downlink channel. The apparatus may also include a processing system configured to monitor for the at least one downlink channel based, at least in part, on the message.

Certain aspects provide an apparatus for wireless communications by a user equipment (UE). The apparatus generally includes means for obtaining a message, the message including: a first field including at least one wake-up indication bit associated with a user equipment (UE) and a second field including coverage information associated with at least one downlink channel. The apparatus may also include means for monitoring for the at least one downlink channel based, at least in part, on the message.

Certain aspects provide a computer-readable medium for wireless communications by a user equipment (UE). The computer-readable medium includes codes executable to obtain a message and monitor for the at least one downlink channel based, at least in part, on the message. In some cases, the message includes a first field including at least one wake-up indication bit associated with a user equipment (UE) and a second field including coverage information associated with at least one downlink channel.

Certain aspects provide a user equipment (UE) for wireless communications. The UE includes a receiver configured to receive a message, the message including: a first field including at least one wake-up indication bit associated with a user equipment (UE) and a second field including coverage information associated with at least one downlink channel. Additionally, the UE may include a processing system configured to monitor for the at least one downlink channel based, at least in part, on the message.

Certain aspects provide a method for wireless communications by a base station. The method generally includes generating a message, the message including: a first field including at least one wake-up indication bit associated with a user equipment (UE) and a second field including coverage information associated with at least one downlink channel. The method may also include outputting the message for transmission to the UE.

Certain aspects provide an apparatus for wireless communications by a base station. The apparatus generally includes a processing system configured to generate a message, the message including: a first field including at least one wake-up indication bit associated with a user equipment (UE) and a second field including coverage information associated with at least one downlink channel. The apparatus may also include an interface configured to output the message for transmission to the UE.

Certain aspects provide an apparatus for wireless communications by a base station. The apparatus generally includes means for generating a message, the message including: a first field including at least one wake-up indication bit associated with a user equipment (UE) and a second field including coverage information associated with at least one downlink channel. The apparatus may also include means for outputting the message for transmission to the UE.

Certain aspects provide a computer-readable medium for wireless communications by a base station. The computer-readable medium includes codes executable to generate a message and output the message for transmission to the UE. In some cases, the message includes a first field including at least one wake-up indication bit associated with a user equipment (UE) and a second field including coverage information associated with at least one downlink channel.

Certain aspects provide a base station for wireless communications. The base station includes a processing system configured to generate a message, and a transmitter configured to transmit the message to the UE. In some cases, the message includes a first field including at least one wake-up indication bit associated with a user equipment (UE) and a second field including coverage information associated with at least one downlink channel.

Certain aspects of the present disclosure also provide various apparatuses, means, and computer readable medium configured to perform (or cause a processor to perform) the operations described herein.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Aspects of the present disclosure provide apparatus, methods, processing systems, and computer readable mediums for coverage enhancement information indication via wake-up signaling. For example, aspects of the present disclosure provide techniques for indicating coverage enhancement information within a wake-up signal (WUS). The WUS may be transmitted to a user equipment (UE) and received by the UE while the UE is operating in a sleep state of a connected discontinuous reception (CDRX) mode. After receiving the WUS, the UE may transition to an awake state of the CDRX mode and may use the coverage enhancement information to monitor for one or more repetitions of at least one downlink channel during the awake state.

The following description provides examples of coverage enhancement information indication via wake-up signaling in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G NR RAT network may be deployed.

Figure 1:
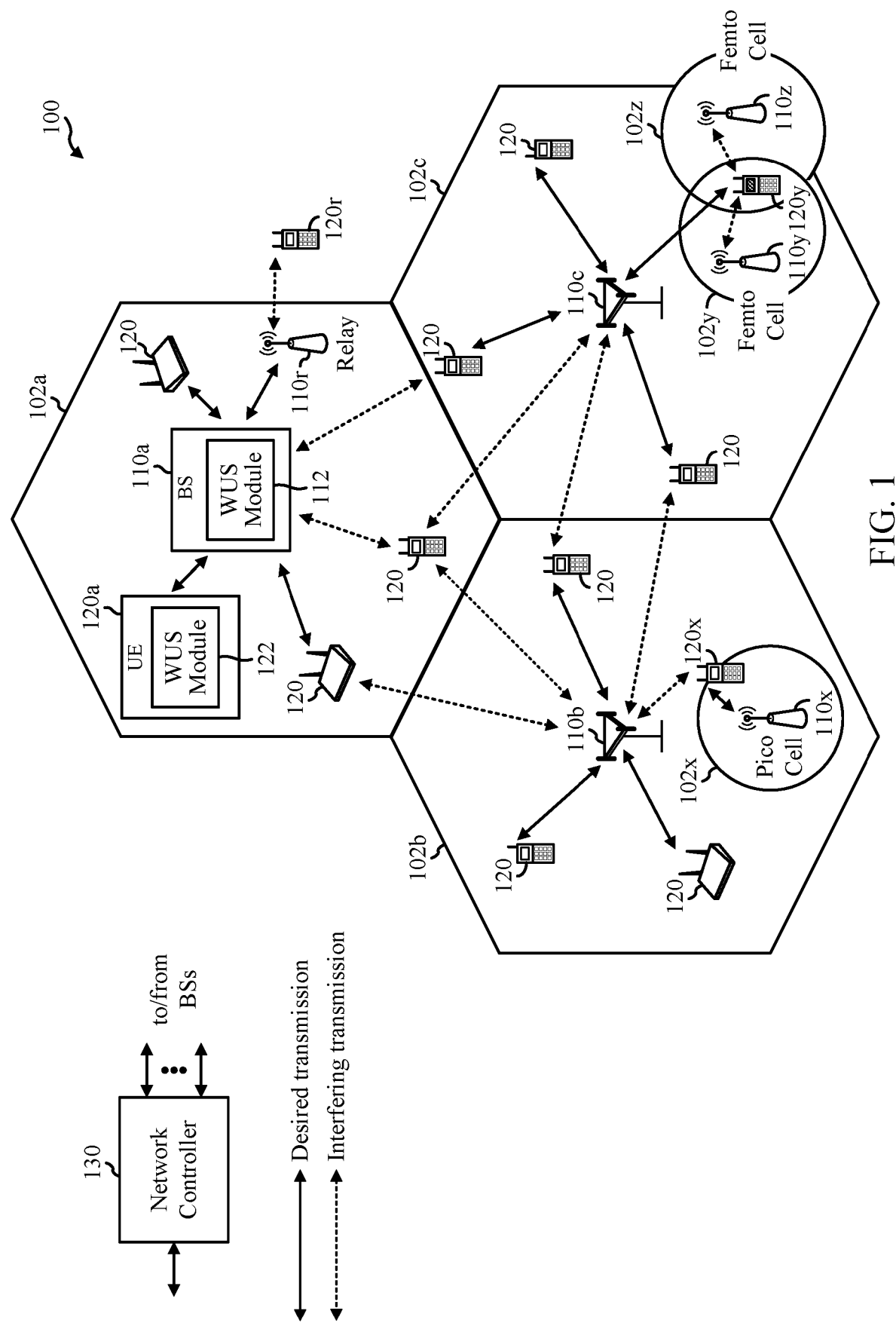
FIG. 1 is a block diagram conceptually illustrating an example telecommunications system, in accordance with certain aspects of the present disclosure.

FIG. 1 illustrates an example wireless communication network 100 in which aspects of the present disclosure may be performed. For example, the wireless communication network 100 may be an NR system (e.g., a 5G NR network).

As illustrated in FIG. 1, the wireless communication network 100 may include a number of base stations (BSs) 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with user equipment (UEs) 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile.

According to certain aspects, the BSs 110 and UEs 120 may be configured for mobility-aware access control as described herein. As shown in FIG. 1, the BS 110a includes a wake-up signal (WUS) module 112. The WUS module 112 may be configured to perform the operations illustrated in one or more of FIG. 9 for indicating coverage enhancement information via wake-up signaling, in accordance with aspects of the present disclosure. Additionally, as shown in FIG. 1, the UE 120a includes a WUS module 122. The WUS module 122 may be configured to perform the operations illustrated in one or more of FIG. 8 for receiving coverage enhancement information via wake-up signaling, in accordance with aspects of the present disclosure.

Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

Figure 2:
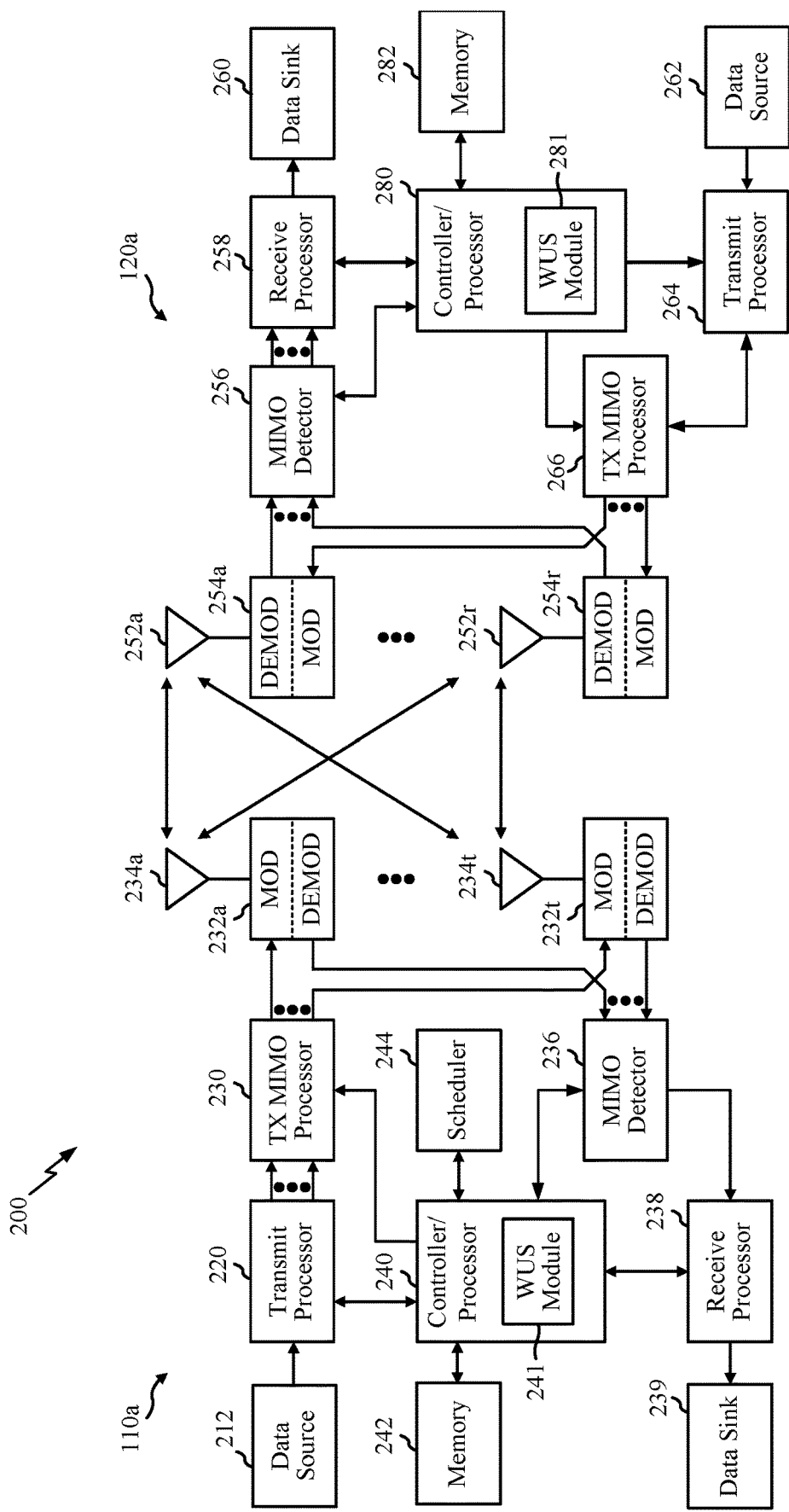
FIG. 2 is a block diagram conceptually illustrating a design of an example base station (BS) and user equipment (UE), in accordance with certain aspects of the present disclosure.

FIG. 2 illustrates example components of BS 110a and UE 120a (e.g., in the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a-254r (e.g., for SC-FDM, etc.), and transmitted to the BS 110a. At the BS 110a, the uplink signals from the UE 120a may be received by the antennas 234, processed by the modulators 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

The controller/processor 280 and/or other processors and modules at the UE 120a may perform or direct the execution of processes for the techniques described herein. For example, as shown in FIG. 2, the controller/processor 240 of the BS 110a includes an wake-up signal (WUS) module 241 that may be configured to perform the operations illustrated in one or more of FIG. 9 for indicating coverage enhancement information via wake-up signaling, according to aspects described herein. As shown in FIG. 2, the controller/processor 280 of the UE 120a includes WUS module 281 that may be configured to perform the operations illustrated in one or more of FIG. 8 for receiving coverage enhancement information via wake-up signaling, according to aspects described herein. Although shown at the Controller/Processor, other components of the UE 120a and BS 110a may be used performing the operations described herein.

Example C-DRX with Beamforming and Wake-Up Signals

Figure 3:
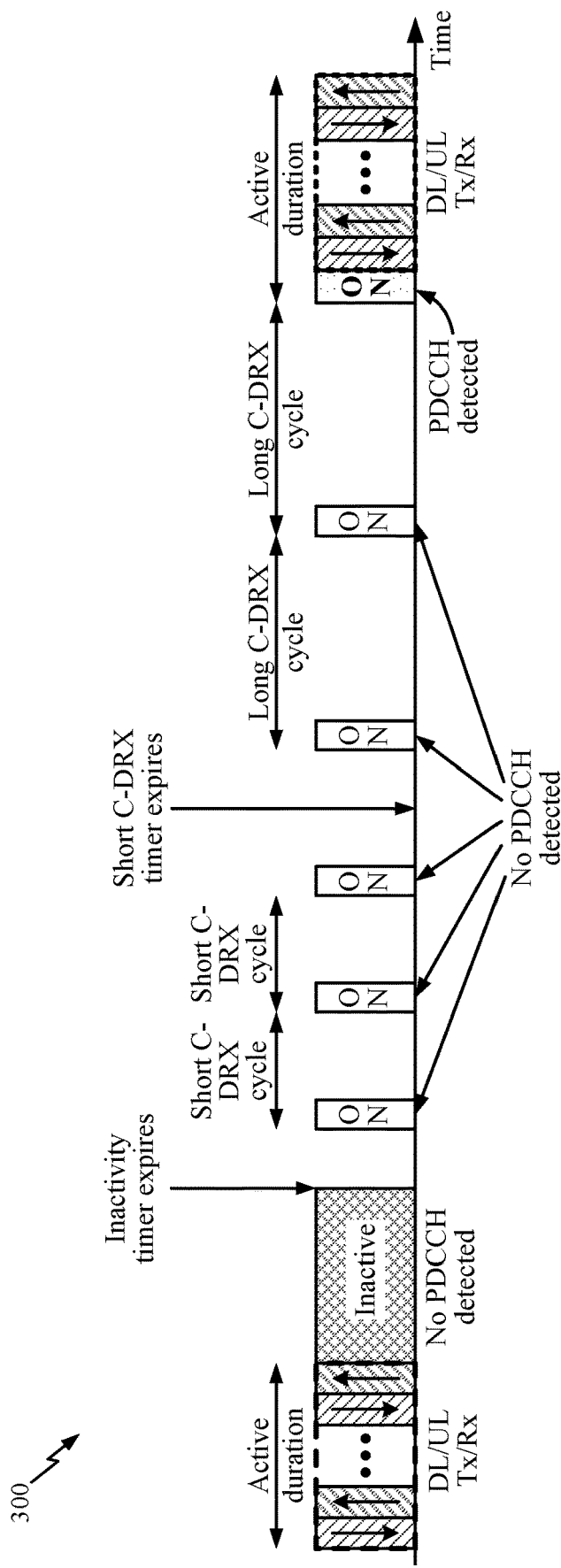
FIG. 3 illustrates connected discontinuous reception (C-DRX) operations, in which aspects of the present disclosure may be practiced.

As illustrated in the example timing diagram 300 of FIG. 3, during periods of traffic inactivity, UE may switch to connected mode discontinuous reception (C-DRX) operation for power saving. In C-DRX, when there is no data transmission in either direction (UL/DL) for a UE in an RRC connected mode, the UE goes into the DRX mode. In C-DRX, the UE monitors the PDCCH channel discontinuously. In other words UE alternates between sleep (DRX OFF) cycles and wake (DRX ON) cycles. C-DRX results in power savings because, without the DRX cycles, the UE would needlessly monitor for PDCCH transmissions in every subframe to check if there is downlink data available.

A UE may be configured for C-DRX according to various configuration parameters, such as an inactivity timer, short DRX timer, short DRX cycle, and long DRX cycle.

As illustrated in FIG. 3, based on configured cycles, UE wakes up occasionally for ON durations and monitors for PDCCH transmissions. Except for ON durations, the UE may remain in a low power (sleep) state referred to as an OFF duration, for the rest of C-DRX cycle. During the OFF duration, the UE is not expected to transmit and receive any signal.

As illustrated, the UE may wake-up at a termination of C-DRX mode. For example, if the UE detects a PDCCH scheduling data during an ON duration, UE remains on to transmit and receive data. Otherwise, the UE goes back to sleep at the end of the ON duration.

Figure 4:
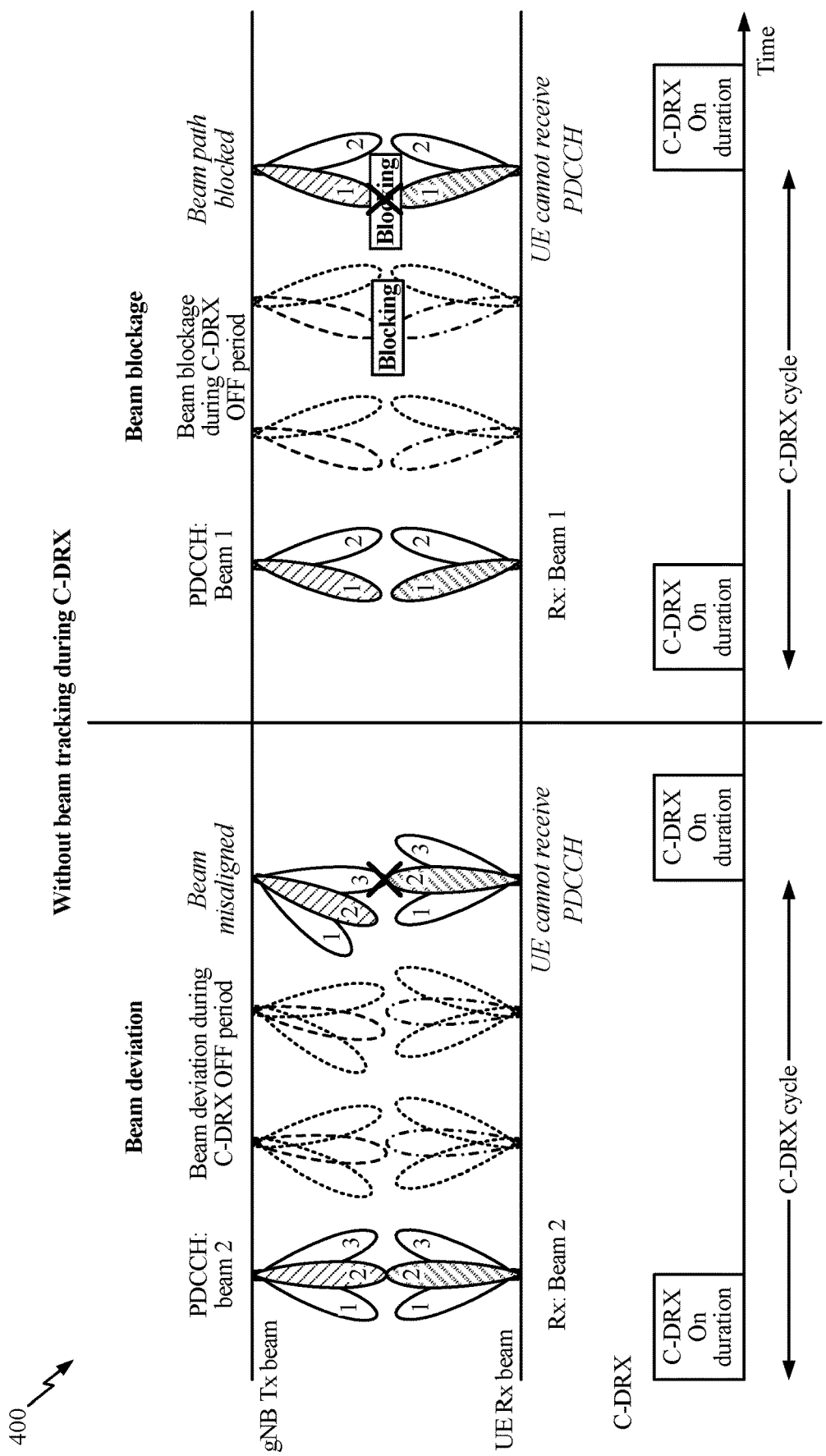
FIG. 4 illustrates C-DRX with beamforming, in accordance with certain aspects of the present disclosure.

As illustrated in the example timing diagram 400 of FIG. 4, in some cases, to enhance possibility or reaching the UE, beamforming may be used with C-DRX. While beamforming may enhance communications, it is not without challenges. For example, without beam tracking, beam pairs may degrade during C-DRX OFF period. The longer the C-DRX cycle, the more vulnerable transmissions are to beam degradation. While shorter C-DRX cycles may be less prone to beam degradation, shorter periods suffer from a power consumption penalty.

As illustrated in FIG. 4, due beam deviation by UE orientation change or mobility (or beam blocking or MPE, etc.), a UE may not be able to receive PDCCH in the beginning of the next C-DRX ON duration and fail to wake-up.

In some cases, sleep (OFF) durations may be extended using wake-up signals (WUS). The general principle of WUS in C-DRX is illustrated the example timing diagram 500 of in FIG. 5. A WUS is a special physical downlink control channel (PDCCH) (e.g., DCI format 2_6) sent by the network before a C-DRX on duration to indicate whether the UE may skip monitoring the next DRX on duration. For example, the WUS may indicate whether a media access control (MAC) entity should start a drx-onDurationTimer for a next DRX cycle. The WUS may not impact other timers of the UE (e.g., bwp-inactivityTimer, dataInactivityTimer, and sCellDeactivationTimer).

Generally, WUS may be associated with a two-stage wake-up. For example, the first stage may include PDCCH-WUS detection and the second stage may include monitoring for scheduling and reception of new data. In some cases, when a UE detects a WUS message, the UE may begin monitoring after a particular pre-wake-up offset (e.g., ps_Offset) 514, indicating a time that the UE starts locating monitoring occasions for DCI format 2_6 prior to a slot where a DRX cycle start. In some cases, ps_Offset∈{0.12 5 ms, 0.25 ms, 0.375 ms, . . . , 15 ms}.

Figure 5:
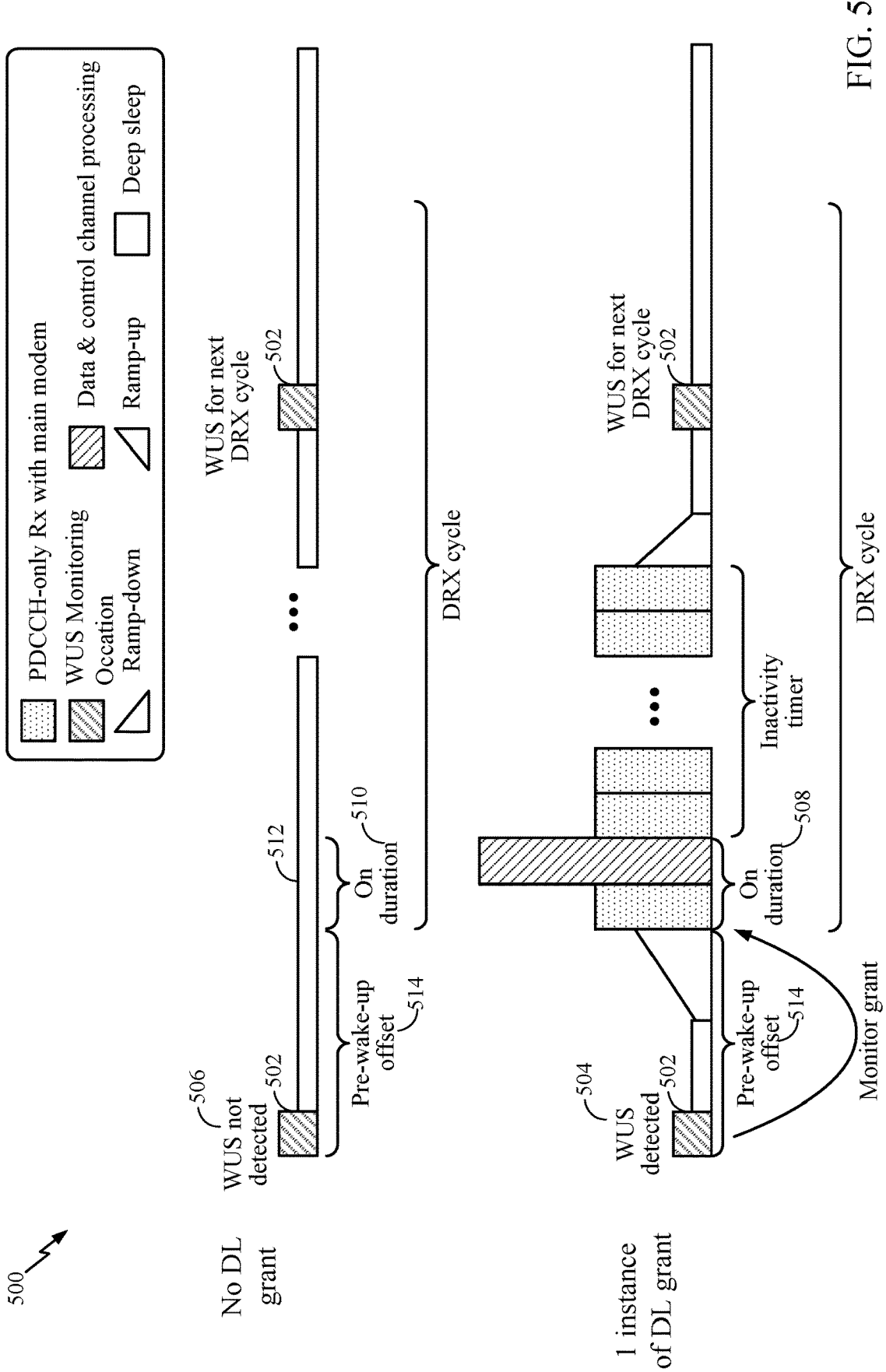
FIG. 5 illustrates example C-DRX with wake-up signals (WUS), in accordance with certain aspects of the present disclosure.

Accordingly, as illustrated in FIG. 5, before a C-DRX ON duration, only a wake-up subsystem may be turned on for WUS decoding (while the main modem is not powered on). The wake-up subsystem is typically a low complexity receiver (e.g., a simple correlator) using lower power than PDCCH decoding. The WUS may be a special waveform, such as special tone, preamble, reference-signal, or the like.

For example, as illustrated, the UE may be configured with a set of WUS monitoring occasions 502 to monitor for a WUS outside of a DRX ON duration during each DRX cycle. Only when WUS is detected in a monitoring occasion 502, as illustrated at 504, the UE may wake-up the full modem for the next ON duration 508 and monitors for scheduling and reception of new data. The UE may then transition back to sleep after expiration of an inactivity timer. However, as illustrated at 506, if a WUS is not detected during the monitoring occasion 502, the UE skips ON duration 510 and goes back to sleep until the next C-DRX cycle. For example, as illustrated, if a WUS is not detected at 506, the UE may remain in a deep sleep 512 until the next WUS monitoring occasion 502.

Figure 6:
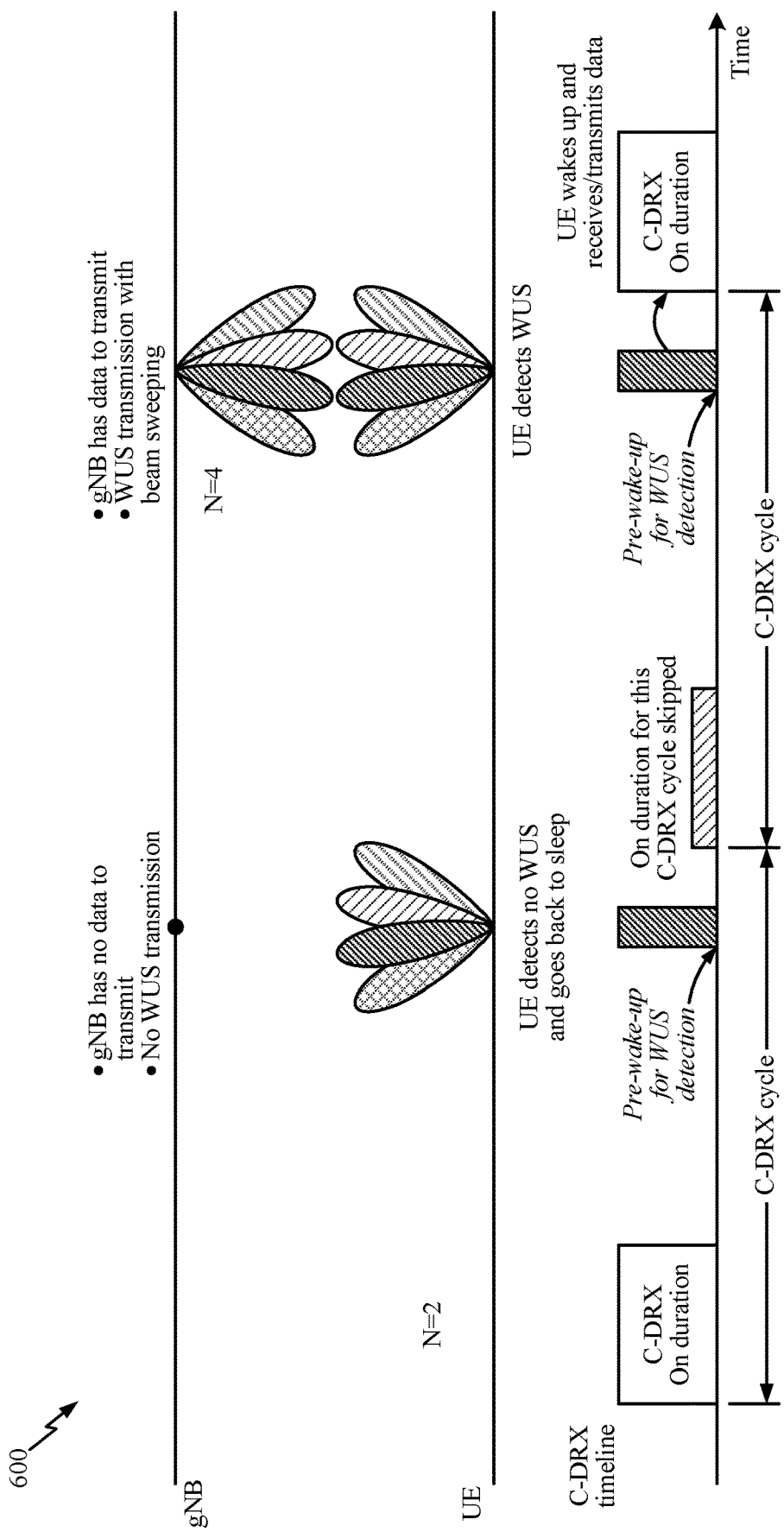
FIG. 6 illustrates example C-DRX with beamformed WUS, in accordance with certain aspects of the present disclosure.

As illustrated in the example timing diagram 600 of FIG. 6, beamforming may also be applied to WUS transmissions. For example, a set of N (e.g., out of up to 64 SSBs) beams may be configured for a UE. The value of N, and the directions of N beams, may be UE (or group)-specifically determined by gNB (e.g., as a function of link quality, UE mobility, UE capability, C-DRX cycle length, etc.).

Example Coverage Enhancement Indication Via Wake-Up Signaling

Figure 7:
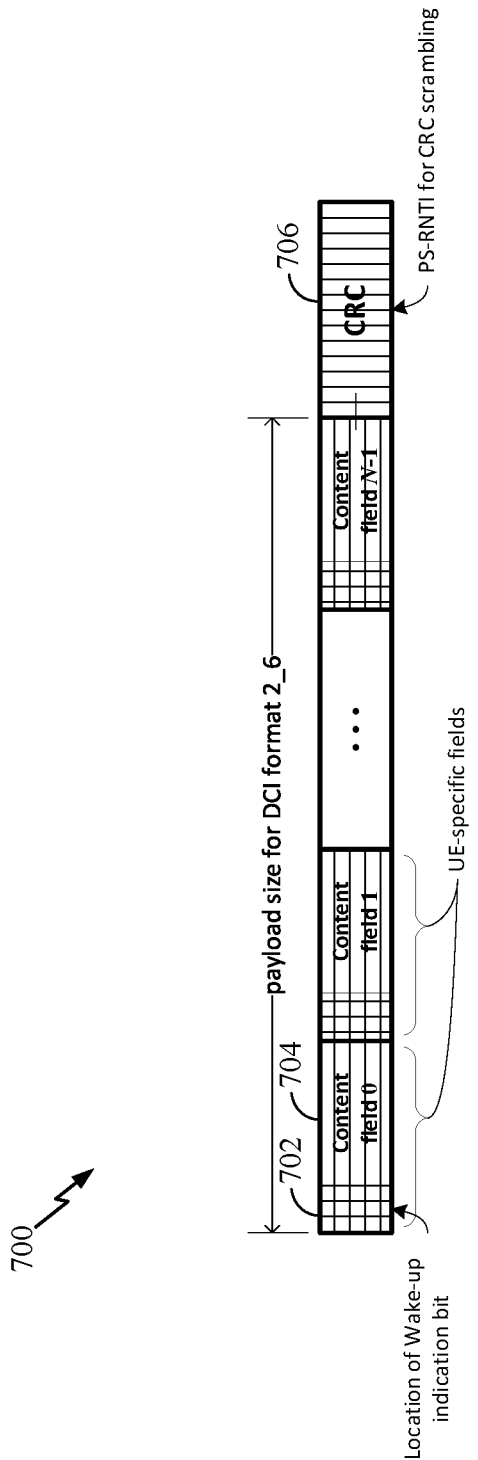
FIG. 7 illustrates an example wake-up signal, in accordance with certain aspects of the present disclosure

As described above, wake-up signals (WUS) may be used to improve power efficiency during C-DRX operation. FIG. 7 illustrates an example WUS message 700, in accordance with certain aspects presented herein.

In some cases, a WUS message (e.g., DCI format 2_6) can be shared by a group of UE. In this case, each UE in the group may be assigned with a UE-specific field in the DCI. For example, as illustrated, the WUS message 700 may include a plurality of UE-specific fields, each corresponding to a different UE. For example, as illustrated, the WUS message 700 may include a plurality of wake-up indication bit fields 702 and a plurality of UE-specific content fields 704. In some cases, each pair of wake-up indication bit fields and UE-specific content fields 704 may correspond to, and carry information for, a different UE. In some cases, the wake-up indication bit field 702 may include at least one wake-up indication bit associated with UE. The wake-up indication bit may be detected by the associated UE during a WUS monitoring occasion and may direct the associated UE to wake up from a CDRX sleep state (e.g., an OFF duration of the CDRX mode).

In some cases, the content fields 704 may include one or more bits indicating dormancy information of one or more cells (e.g., cell groups, up to 5) associated with the UE corresponding to that content field 704. In some cases, the one or more cells may comprise one or more secondary cells associated with the UE. The dormancy information may indicate dormancy behavior of the one or more cells outside the ON duration of the CDRX mode. For example, in some cases, the dormancy information may indicate whether a cell associated with that UE is in a dormant state (e.g., to conserve power at the UE) outside of the ON duration of the CDRX mode. In some cases, dormancy information for the one or more cells during the ON duration of the CDRX mode may be configured separately by scheduling a separate downlink control information (DCI) message.

Additionally, as illustrated, the WUS message 700 may include a cyclic redundancy check (CRC) field 706. In some cases, the CRC field 706 may be scrambled with a power saving radio network temporary identifier (PS-RNTI) corresponding to the UE. In some cases, the CRC scrambled with the PS-RNTI may allow the UE to verify whether the WUS message was intended for the UE.

In some cases, the UE may receive configuration information for receiving a WUS. For example, as noted above, the WUS message may comprise a DCI format 2_6 message. Accordingly, the configuration information may include, for example, an indication of the PS-RNTI for scrambling CRC of DCI format 2_6, Type3-PDCCH common search space (CSS) set(s) for monitoring DCI format 2_6 with PS-RNTI, a payload size of the DCI format 2_6 message, and a location of wake-up indication bit for indicating a position of UE-specific fields. In some cases, more than one search space set can be configured for DCI format 2_6 and the control resource sets (CORESETs) associated with the search space sets may have different transmission configuration indicator (TCI) states (e.g., WUS beam sweeping in FR2).

As noted above, in some cases, to enhance possibility or reaching the UE, beamforming may be used when transmitting WUSs during CDRX. For example, in some cases, a WUS may be transmitted over a narrow unicast serving beam focused in the direction of the UE. Accordingly, beam reliability is important to ensure adequate coverage for unicast channels in FR2. However, in certain cases, the narrow unicast serving beam used to transmit a WUS may become weak or may suffer from partial shadowing. In such cases, when the serving beam becomes weak, coverage enhancement may be needed for the UE to accurately receive transmission (e.g., control and/or data) on the serving beam until a new beam is assigned to the UE. Coverage enhancements generally include using repetition techniques in which a particular downlink channel (e.g., a PDCCH) is repeatedly transmitted a configured number of times, allowing the UE to receive and combine the repeated transmissions. By combining repeated transmissions, the UE is able to more accurately receive the downlink channel and improve the chances that the downlink channel is decoded properly.

However, when coverage enhancements are needed due to degradation of the serving beam, the UE may be operating in a sleep state (e.g., OFF duration) of a CDRX mode. In this case, the base station may not be able to configure the UE with the coverage enhancements to improve reception of the downlink channel on the serving beam since the UE is in the sleep state. Accordingly, when the UE receives a WUS to wake up from the sleep state of the CDRX mode, the UE may not be able to properly receive the downlink channel on the serving beam since the serving beam degraded during the sleep state and the UE was not configured with coverage enhancements to improve reception of the downlink channel on the serving beam (e.g., due to being in the sleep state).

Accordingly, aspects of the present disclosure provide techniques for configuring a UE with coverage enhancements when operating in a CDRX mode. For example, in some cases, such techniques may involve including coverage enhancement information in a WUS message received before an ON duration of the CDRX mode. By including the coverage enhancement information in the WUS message, the UE may be afforded a sufficient amount of time (e.g., ps_Offset) to properly configure itself to receive one or more repetitions of a downlink channel during the ON duration of the CDRX mode.

Figure 8:
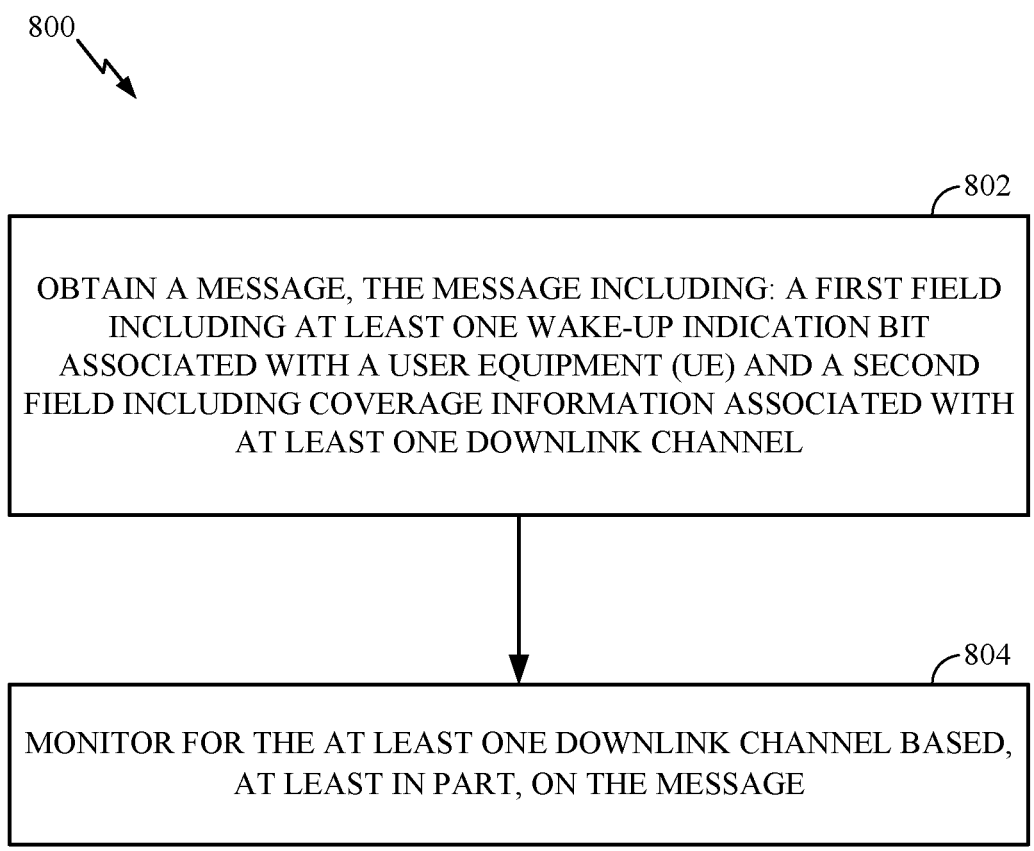
FIG. 8 illustrates example operations for wireless communications by a user equipment, in accordance with certain aspects of the present disclosure.

FIG. 8 illustrates example operations 800 for wireless communications by wireless node (e.g., a UE), for example, for receiving coverage enhancement information via wake-up signaling. Operations 800 may be implemented as software components that are executed and run on a processing system including one or more processors (e.g., controller/processor 280 of FIG. 2). Further, the transmission and reception of signals by the UE in operations 500 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

Operations 800 begin at 802 by obtaining a message. In some cases, the message may include a wake-up signal (WUS) and may include a first field including at least one wake-up indication bit associated with a user equipment (UE) and a second field including coverage information associated with at least one downlink channel.

At 804, the wireless node monitors for the at least one downlink channel based, at least in part, on the message.

Figure 9:
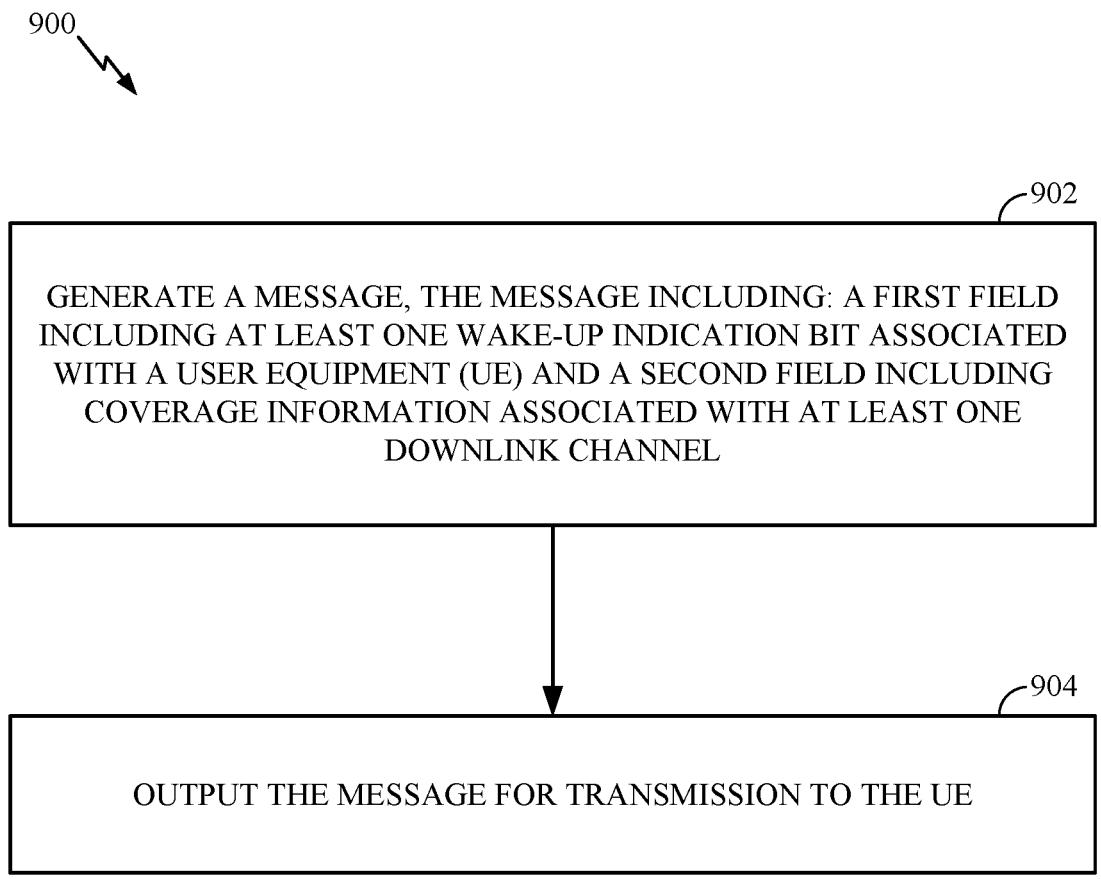
FIG. 9 illustrates example operations for wireless communications by a base station, in accordance with certain aspects of the present disclosure.

FIG. 9 illustrates example operations 900 for wireless communications by a wireless node (e.g., a base station/gNB), for example, for indicating coverage enhancement information via wake-up signaling. Operations 900 may be implemented as software components that are executed and run on a processing system including one or more processors (e.g., controller/processor 240 of FIG. 2). Further, the transmission and reception of signals by the base station in operations 900 may be enabled, for example, by one or more antennas (e.g., antennas 234 of FIG. 2). In certain aspects, the transmission and/or reception of signals by the base station may be implemented via a bus interface of one or more processors (e.g., controller/processor 240) obtaining and/or outputting signals.

Operations 900 begin at 902 by generating a message. In some cases, the message may include a wake-up signal (WUS) and may include a first field including at least one wake-up indication bit associated with a user equipment (UE) and a second field including coverage information associated with at least one downlink channel.

At 904 the wireless node outputs the message for transmission to the UE.

As noted above, aspects of the present disclosure provide techniques for indicating coverage enhancement information via a WUS message. For example, as noted, the base station may generate a message, such as a WUS message. The WUS message may include a first field including at least one wake-up indication bit associated with a user equipment (UE) and a second field including coverage information associated with at least one downlink channel, such as a physical downlink control channel (PDCCH).

In some cases, as noted above, the first field may comprise, for example, a wake-up indication bit field 702. Further, in some cases, the at least one wake-up indication bit included in the first field of the WUS message may direct the UE to wake up from a connected discontinuous reception (CDRX) sleep state to monitor/receive a downlink channel (e.g., a PDCCH).

Additionally, in some cases, second field may comprise, for example, a UE-specific content field, such as the content field 704, which may be used to carry the coverage information. For example, as noted above, in some cases, the second field (e.g., content field 704) may include one or more cell dormancy bits for indicating whether a cell (e.g., a secondary cell) associated with the UE is in a dormant state. In some cases, the coverage information may be indicated using one or more of the cell dormancy bits in the second field. In other cases, one or more additional bits (e.g., with respect to the existing one or more cell dormancy bits) may be included within the second field and used to indicate the coverage information.

In some cases, the coverage information may include, for example, at least one of an indication of a number of repetitions of the at least one downlink channel to receive, an indication of one or more monitoring locations to monitor for the at least one downlink channel, or an indication of a channel format change associated with the at least one downlink channel. Additionally, in some cases, the coverage information may depend on at least one of a frequency range associated with the at least one downlink channel or a sub-carrier spacing associated with the at least one downlink channel.

In some cases, the base station may generate the WUS message with the coverage information based on a prediction that the UE needs coverage enhancement. For example, in some cases, the base station may predict whether the UE needs coverage enhancement based on feedback from at least one other UE that uses a same transmission beam as the UE or a transmission beam neighboring the transmission beam used by the UE. For example, the feedback from the at least one other UE may indicate to the base station that the transmission beam used by the UE is degrading and that the UE will need coverage enhancement to be able to receive the at least one downlink channel when in the awake state of the CDRX mode. Accordingly, in this case, the base station may generate the WUS message, including the coverage information, when the base station predicts that the UE needs coverage enhancement (e.g., because a transmission beam associated with the UE has degraded below a threshold).

After generating the WUS message, the base station may transmit the WUS message to the UE. In some cases, the UE may receive the WUS message by monitoring for the WUS message in a WUS monitoring occasion (e.g., as illustrated at 502 in FIG. 5) during an OFF duration (or sleep state) of the CDRX mode. Thereafter, when the UE receives the WUS message, the UE may transition from a sleep state of the CDRX mode to an awake state of the CDRX mode based on the at least one wake-up indication bit and may monitor for the at least one downlink channel based on the message during the awake state of the CDRX mode.

For example, based on the coverage information included in the message, the UE may monitor for the number of repetitions of the at least one downlink channel in the indicated monitoring locations. Thereafter, based on the monitoring, the UE may receive the one or more repetitions of the at least one downlink channel, combine the received repetitions, and attempt to decode the at least one downlink channel.

In some cases, the coverage information may be preconfigured in the UE and may be activated and deactivated by the base station using the WUS. For example, in some cases, the base station may generate information for configuring repetition of the at least one downlink channel and may output and transmit the information for configuring the repetition to the UE (e.g., separately from the WUS). Thereafter, the base station may activate the repetition configuration at the UE by transmitting at least one bit activating the repetition of the at least one downlink channel within the coverage information transmitted in the second field of the WUS. In response to the information for configuring the repetition and the at least one bit activating the repetition, the UE may monitor for one or more repetitions of the at least one downlink channel.

In some cases, as noted above, the WUS message may further include a cyclic redundancy check (CRC) scrambled with a power saving radio network temporary identifier (PS-RNTI) corresponding to the UE. In this case, the UE may use the CRC scrambled with the PS-RNTI to verify that the WUS message is intended for the UE.

Accordingly, aspects presented herein provide techniques for indicating coverage enhancement information using a WUS message, for example, when a transmission beam degrades (e.g., below a threshold) during CDRX operation. By indicating the coverage enhancement information using a WUS message, the UE may have enough time to transition from a sleep state of the CDRX mode and configure itself to monitor for one or more repetitions of the at least one downlink channel during an awake state, thereby allowing the UE to continue communicating with the base station until another transmission beam can be assigned to the UE with better signal quality.

Figure 10:
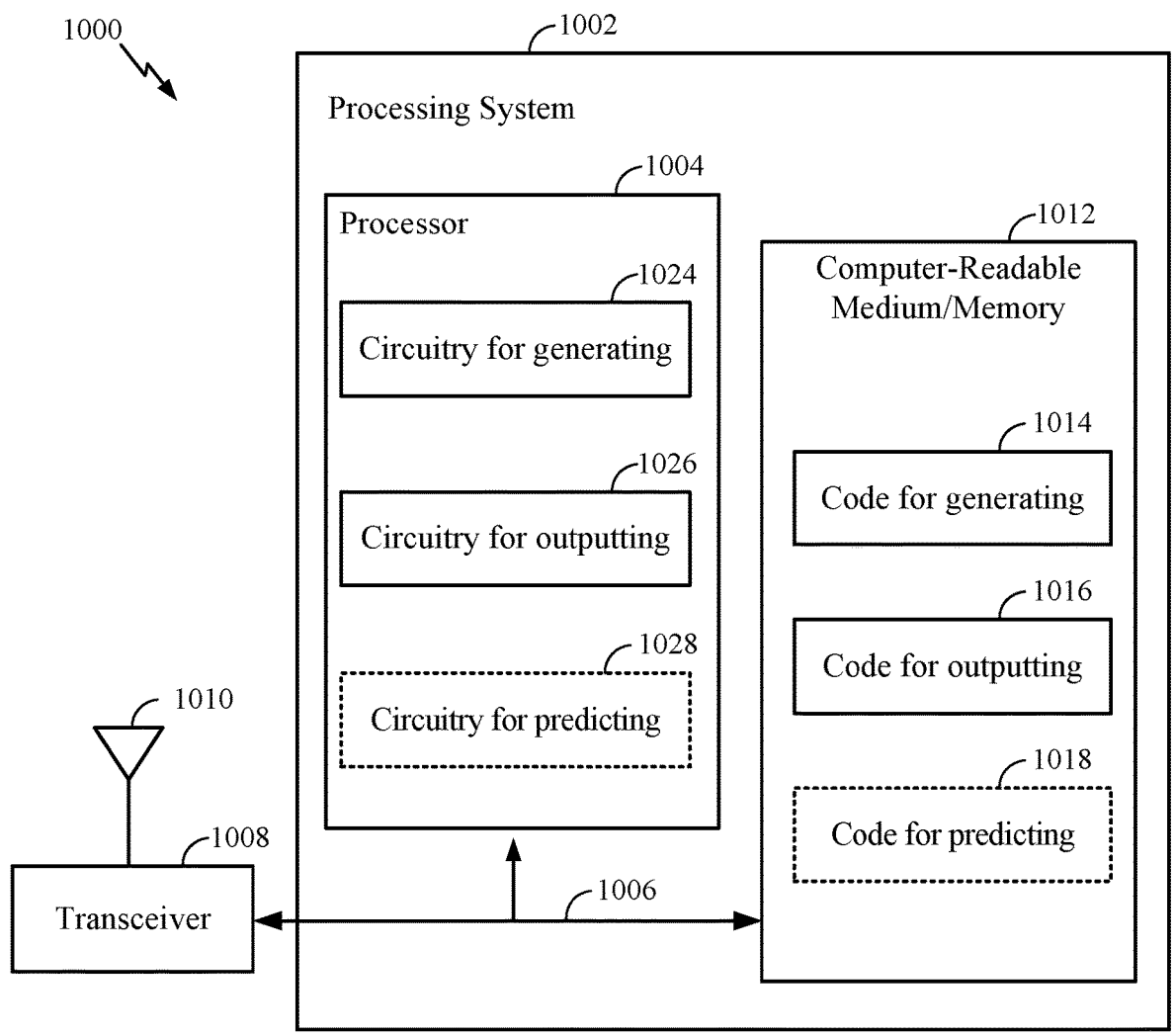
FIG. 10 illustrates a wireless node that may include various components configured to perform operations for the techniques disclosed herein in accordance with aspects of the present disclosure.

FIG. 10 illustrates a wireless node 1000 that may include various components (e.g., corresponding to means-plus-function components) configured to perform operations for the techniques disclosed herein, such as the operations illustrated in FIG. 9. The wireless node 1000 includes a processing system 1002 coupled to a transceiver 1008. The transceiver 1008 is configured to transmit and receive signals for the wireless node 1000 via an antenna 1010, such as the various signals as described herein. The processing system 1002 may be configured to perform processing functions for the wireless node 1000, including processing signals received and/or to be transmitted by the wireless node 1000.

The processing system 1002 includes a processor 1004 coupled to a computer-readable medium/memory 1012 via a bus 1006. In certain aspects, the computer-readable medium/memory 1012 is configured to store instructions (e.g., computer-executable code) that when executed by the processor 1004, cause the processor 804 to perform the operations illustrated in FIG. 9, or other operations for performing the various techniques discussed herein for coverage enhancement information indication via wake-up signaling. For example, computer-readable medium/memory 1012 stores code 1014 for generating, code 1016 for outputting, and code 1018 for predicting.

In some cases, code 1014 for generating may include code for generating a message, the message including: a first field including at least one wake-up indication bit associated with a user equipment (UE) and a second field including coverage information associated with at least one downlink channel.

In some cases, code 1016 for outputting may include code for outputting the message for transmission to the UE. In some cases, the code for outputting the message may include code for outputting the message for transmission via the transceiver 1008.

Additionally, in some cases, code 1014 for generating may include code for generating information for configuring repetition of the at least one downlink channel.

Additionally, in some cases, code 1016 for outputting may include code for outputting, for transmission to the UE, the information for configuring the repetition. In some cases, the code for outputting the information for configuring the repetition may include code for outputting the information for configuring the repetition for transmission via the transceiver 1008.

Additionally, in some cases, code 1018 for predicting may include code for predicting whether the UE needs coverage enhancement based on feedback from at least one other UE that uses a same transmission beam as the UE or a transmission beam neighboring the transmission beam used by the UE.

Additionally, in some cases, code 1014 for generating may include code for generating the message, including the coverage information, based on the prediction that the UE needs the coverage enhancement.

In certain aspects, the processor 1004 may include circuitry configured to implement the code stored in the computer-readable medium/memory 1012, such as for performing the operations illustrated in FIG. 9. For example, the processor 804 includes circuitry 1024 for generating, circuitry 1026 for outputting, and circuitry 1028 for predicting.

In some cases, circuitry 1024 for generating may include circuitry for generating a message, the message including: a first field including at least one wake-up indication bit associated with a user equipment (UE) and a second field including coverage information associated with at least one downlink channel.

In some cases, circuitry 1026 for outputting may include circuitry for outputting the message for transmission to the UE. In some cases, the circuitry for outputting the message may include circuitry for outputting the message for transmission via the transceiver 1008.

Additionally, in some cases, circuitry 1024 for generating may include circuitry for generating information for configuring repetition of the at least one downlink channel.

Additionally, in some cases, circuitry 1026 for outputting may include circuitry for outputting, for transmission to the UE, the information for configuring the repetition. In some cases, the circuitry for outputting the information for configuring the repetition may include circuitry for outputting the information for configuring the repetition for transmission via the transceiver 1008.

Additionally, in some cases, circuitry 1028 for predicting may include circuitry for predicting whether the UE needs coverage enhancement based on feedback from at least one other UE that uses a same transmission beam as the UE or a transmission beam neighboring the transmission beam used by the UE.

Additionally, in some cases, circuitry 1024 for generating may include circuitry for generating the message, including the coverage information, based on the prediction that the UE needs the coverage enhancement.

Figure 11:
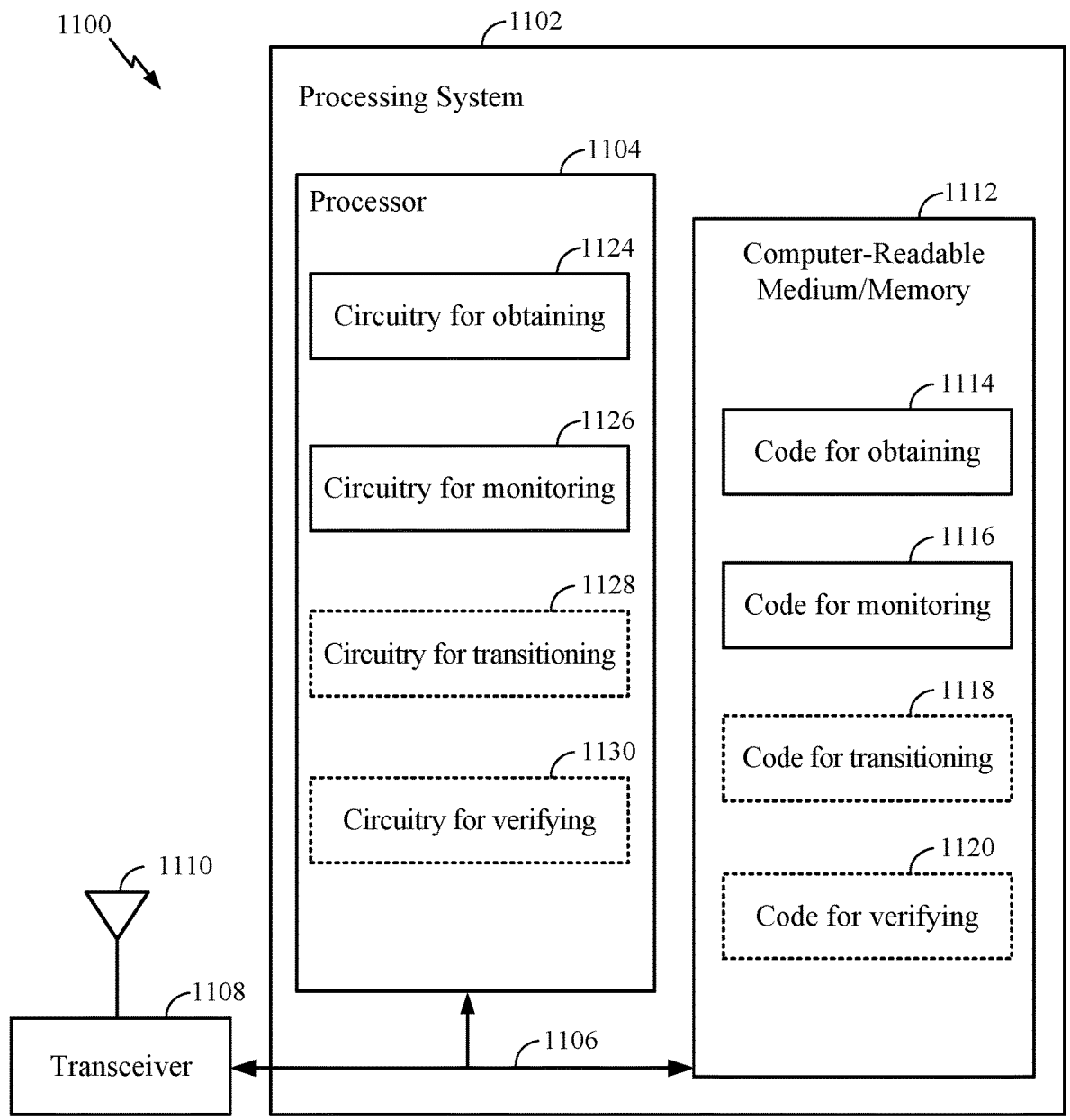
FIG. 11 illustrates a wireless node that may include various components configured to perform operations for the techniques disclosed herein in accordance with aspects of the present disclosure.

FIG. 11 illustrates a wireless node 1100 that may include various components (e.g., corresponding to means-plus-function components) configured to perform operations for the techniques disclosed herein, such as the operations illustrated in FIG. 8. The wireless node 1100 includes a processing system 1102 coupled to a transceiver 1108. The transceiver 1108 is configured to transmit and receive signals for the wireless node 1100 via an antenna 1110, such as the various signals as described herein. The processing system 1102 may be configured to perform processing functions for the wireless node 1100, including processing signals received and/or to be transmitted by the wireless node 1100.

The processing system 1102 includes a processor 1104 coupled to a computer-readable medium/memory 1112 via a bus 1106. In certain aspects, the computer-readable medium/memory 1112 is configured to store instructions (e.g., computer-executable code) that when executed by the processor 1104, cause the processor 904 to perform the operations illustrated in FIG. 8, or other operations for performing the various techniques discussed herein for coverage enhancement information indication via wake-up signaling. For example, computer-readable medium/memory 1112 stores code 1114 for obtaining, code 1116 for monitoring, code 1118 for transitioning, and code 1120 for verifying.

In some cases, code 1114 for obtaining may include code for obtaining a message, the message including: a first field including at least one wake-up indication bit associated with a user equipment (UE) and a second field including coverage information associated with at least one downlink channel. In some cases, the code for obtaining the message may include code for obtaining the message via the transceiver 1108.

In some cases, code 1116 for monitoring may include code for monitoring for the at least one downlink channel based, at least in part, on the message.

In some cases, code 1118 for transitioning may include code for transitioning from a sleep state of a connected discontinuous reception (CDRX) mode to an awake state of the CDRX mode based on the at least one wake-up indication bit.

In some cases, code 1116 for monitoring may include code for monitoring for the at least one downlink channel based on the message during the awake state of the CDRX mode.

In some cases, code 1114 for obtaining may include code for obtaining information for configuring repetition of the at least one downlink channel. In some cases, the code for obtaining the information for configuring repetition of the at least one downlink channel may include code for obtaining the information for configuring repetition of the at least one downlink channel via the transceiver 1108.

In some cases, code 1116 for monitoring may include code for monitoring for one or more repetitions of the at least one downlink channel based on at least one of the information for configuring the repetition of the at least one downlink channel or at least one bit activating the repetition of the at least one downlink channel.

In some cases, code 1120 for verifying may include code for verifying that the message is intended for the UE based on a power saving radio network temporary identifier (PS-RNTI).

In certain aspects, the processor 1104 may include circuitry configured to implement the code stored in the computer-readable medium/memory 1112, such as for performing the operations illustrated in FIG. 8. For example, the processor 1104 includes circuitry 1124 for obtaining, circuitry 1126 for monitoring, circuitry 1128 for transitioning, and circuitry 1130 for verifying.

In some cases, circuitry 1124 for obtaining may include circuitry for obtaining a message, the message including: a first field including at least one wake-up indication bit associated with a user equipment (UE) and a second field including coverage information associated with at least one downlink channel. In some cases, the circuitry for obtaining the message may include circuitry for obtaining the message via the transceiver 1108.

In some cases, circuitry 1126 for monitoring may include circuitry for monitoring for the at least one downlink channel based, at least in part, on the message.

In some cases, circuitry 1128 for transitioning may include circuitry for transitioning from a sleep state of a connected discontinuous reception (CDRX) mode to an awake state of the CDRX mode based on the at least one wake-up indication bit.

In some cases, circuitry 1126 for monitoring may include circuitry for monitoring for the at least one downlink channel based on the message during the awake state of the CDRX mode.

In some cases, circuitry 1124 for obtaining may include circuitry for obtaining information for configuring repetition of the at least one downlink channel. In some cases, the circuitry for obtaining the information for configuring repetition of the at least one downlink channel may include circuitry for obtaining the information for configuring repetition of the at least one downlink channel via the transceiver 1108.

In some cases, circuitry 1126 for monitoring may include circuitry for monitoring for one or more repetitions of the at least one downlink channel based on at least one of the information for configuring the repetition of the at least one downlink channel or at least one bit activating the repetition of the at least one downlink channel.

In some cases, circuitry 1130 for verifying may include circuitry for verifying that the message is intended for the UE based on a power saving radio network temporary identifier (PS-RNTI).

Example Aspects

Aspect 1: A method for wireless communications by a base station (BS), comprising: generating a message, the message including a first field including at least one wake-up indication bit associated with a user equipment (UE), and a second field including coverage information associated with at least one downlink channel; and outputting the message for transmission to the UE.

Aspect 2: The method of Aspect 1, wherein the coverage information includes at least one of: an indication of a number of repetitions of the at least one downlink channel to receive; an indication of one or more monitoring locations to monitor for the at least one downlink channel; or an indication of a channel format change associated with the at least one downlink channel.

Aspect 3: The method of any one of Aspects 1-2, wherein the second field further includes: one or more cell dormancy indication bits for indicating whether a cell associated with the UE is in a dormant state; and one or more additional bits for indicating the coverage information.

Aspect 4: The method of any one of Aspects 1-3, wherein the second field includes one or more cell dormancy indication bits for indicating the coverage information.

Aspect 5: The method of any one of Aspects 1-4, wherein the at least one wake-up indication bit directs the UE to wake up from a connected discontinuous reception (CDRX) sleep state.

Aspect 6: The method of any one of Aspects 1-5, further comprising: generating information for configuring repetition of the at least one downlink channel; and outputting, for transmission to the UE, the information for configuring the repetition.

Aspect 7: The method of Aspect 6, wherein the coverage information includes at least one bit activating the repetition of the at least one downlink channel.

Aspect 8: The method of any one of Aspects 1-7, wherein the coverage information depends on at least one of: a frequency range associated with the at least one downlink channel; or a sub-carrier spacing associated with the at least one downlink channel.

Aspect 9: The method of any one of Aspects 1-8, wherein the message further includes a cyclic redundancy check (CRC) scrambled with a power saving radio network temporary identifier (PS-RNTI) corresponding to the UE.

Aspect 10: The method of any one of Aspects 1-9, further comprising: predicting whether the UE needs coverage enhancement based on feedback from at least one other UE that uses a same transmission beam as the UE or a transmission beam neighboring the transmission beam used by the UE, wherein the message is generated based on the prediction that the UE needs the coverage enhancement.

Aspect 11: The method of any one of Aspects 1-10, wherein the at least one downlink channel comprises a physical downlink control channel (PDCCH).

Aspect 12: A method for wireless communication by a user equipment (UE), comprising: obtaining a message, the message including a first field including at least one wake-up indication bit associated with a user equipment (UE), and a second field including coverage information associated with at least one downlink channel; and monitoring for the at least one downlink channel based, at least in part, on the message.

Aspect 13: The method of Aspect 12, further comprising: transitioning from a sleep state of a connected discontinuous reception (CDRX) mode to an awake state of the CDRX mode based on the at least one wake-up indication bit, wherein the at least one downlink channel is monitored during the awake state of the CDRX mode.

Aspect 14: The method of any one of Aspects 12-13, wherein the coverage information includes at least one of: an indication of a number of repetitions of the at least one downlink channel to receive; an indication of one or more monitoring locations to monitor for the at least one downlink channel; or an indication of a channel format change associated with the at least one downlink channel.

Aspect 15: The method of any one of Aspects 12-14, wherein the second field further includes: one or more cell dormancy indication bits for indicating whether a cell associated with the UE is in a dormant state; and one or more additional bits for indicating the coverage information.

Aspect 16: The method of any one of Aspects 12-15, wherein the second field includes one or more cell dormancy indication bits for indicating the coverage information.

Aspect 17: The method of any one of Aspects 12-16, further comprising: obtaining information for configuring repetition of the at least one downlink channel.

Aspect 18: The method of Aspect 17, wherein the coverage information includes at least one bit activating the repetition of the at least one downlink channel.

Aspect 19: The method of any one of Aspects 17-18, wherein monitoring for the at least one downlink channel comprises monitoring for one or more repetitions of the at least one downlink channel based on at least one of the information for configuring the repetition of the at least one downlink channel or the at least one bit activating the repetition of the at least one downlink channel.

Aspect 20: The method of any one of Aspects 12-19, wherein the coverage information depends on at least one of: a frequency range associated with the at least one downlink channel; or a sub-carrier spacing associated with the at least one downlink channel.

Aspect 21: The method of any one of Aspects 12-20, wherein the message further includes a cyclic redundancy check (CRC) scrambled with a power saving radio network temporary identifier (PS-RNTI) corresponding to the UE.

Aspect 22: The method of Aspect 21, further comprising verifying that the message is intended for the UE based on the PS-RNTI.

Aspect 23: The method of Aspect 12, wherein the at least one downlink channel comprises a physical downlink control channel (PDCCH).

Aspect 24: A computer-readable medium method for wireless communications, comprising codes executable by an apparatus to: generate a message, the message including a first field including at least one wake-up indication bit associated with a user equipment (UE), and a second field including coverage information associated with at least one downlink channel; and output the message for transmission to the UE.

Aspect 25: A computer-readable medium method for wireless communications, comprising codes executable by an apparatus to: obtain a message, the message including a first field including at least one wake-up indication bit associated with a user equipment (UE), and a second field including coverage information associated with at least one downlink channel; and monitor for the at least one downlink channel based, at least in part, on the message.

Aspect 26: A base station (BS), comprising: a processing system configured to generate a message, the message including a first field including at least one wake-up indication bit associated with a user equipment (UE), and a second field including coverage information associated with at least one downlink channel; and a transmitter to transmit the message to the UE.

Aspect 27: A user equipment (UE), comprising: a receiver configured to receive a message, the message including a first field including at least one wake-up indication bit associated with a user equipment (UE), and a second field including coverage information associated with at least one downlink channel; and a processing system configured to monitor for the at least one downlink channel based, at least in part, on the message.

Aspect 28: An apparatus for wireless communications by a base station, comprising means for performing the operations of one or more of Aspects 1-11.

Aspect 29: An apparatus for wireless communications by a base station, comprising an interface and a processing system including at least one processor configured to perform the operations of one or more of Aspects 1-11.

Aspect 30: An apparatus for wireless communications by a user equipment, comprising means for performing the operations of one or more of Aspects 12-23.

Aspect 31: An apparatus for wireless communications by a user equipment, comprising an interface and a processing system including at least one processor configured to perform the operations of one or more of Aspects 12-23.

Additional Considerations

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The techniques described herein may be used for the wireless networks and radio technologies mentioned above as well as other wireless networks and radio technologies. For clarity, while aspects may be described herein using terminology commonly associated with 3G, 4G, and/or 5G wireless technologies, aspects of the present disclosure can be applied in other generation-based communication systems.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a wireless node, a wireless communications node, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using TDD. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, processors 258, 264 and 266, and/or controller/processor 280 of the UE 120a shown in FIG. 2 may be configured to perform operations 800 of FIG. 8 and processors 220, 230, 238, and/or controller/processor 240 of the BS 110a shown in FIG. 2 may be configured to perform operations 900 of FIG. 9.

Means for receiving may include a transceiver, a receiver or at least one antenna and at least one receive processor illustrated in FIG. 2. Means for transmitting, means for sending or means for outputting may include, a transceiver, a transmitter or at least one antenna and at least one transmit processor illustrated in FIG. 2. Means for generating, means for predicting, means for monitoring, means for transitioning, and means for verifying may include a processing system, which may include one or more processors, such as processors 258, 264 and 266, and/or controller/processor 280 of the UE 120a and/or processors 220, 230, 238, and/or controller/processor 240 of the BS 110a shown in FIG. 2.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node (e.g., a BS and/or UE). The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIGS. 8-9.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. An apparatus for wireless communications by a base station (BS), comprising:
    a processing system configured to:
        generate a wake-up signal indicating:
            a first field including at least one wake-up indication bit associated with a user equipment (UE); and
            a second field including coverage information associated with at least one downlink channel, wherein the coverage information indicates a number of repetitions of the at least one downlink channel to receive; and
    an interface configured to output the wake-up signal for transmission to the UE.

2. The apparatus of claim 1, wherein the coverage information includes at least one of:
    an indication of one or more monitoring locations to monitor for the at least one downlink channel; or
    an indication of a channel format change associated with the at least one downlink channel.

3. The apparatus of claim 1, wherein the second field further includes:
    one or more cell dormancy indication bits for indicating whether a cell associated with the UE is in a dormant state; and
    one or more additional bits for indicating the coverage information.

4. The apparatus of claim 1, wherein the second field includes one or more cell dormancy indication bits for indicating the coverage information.

5. The apparatus of claim 1, wherein the at least one wake-up indication bit directs the UE to wake up from a connected discontinuous reception (CDRX) sleep state.

6. The apparatus of claim 1, wherein:
    the processing system is further configured to generate information for configuring repetition of the at least one downlink channel; and
    the interface configured to output, for transmission to the UE, the information for configuring the repetition.

7. The apparatus of claim 6, wherein the coverage information includes at least one bit activating the repetition of the at least one downlink channel.

8. The apparatus of claim 1, wherein the coverage information depends on at least one of:
    a frequency range associated with the at least one downlink channel; or
    a sub-carrier spacing associated with the at least one downlink channel.

9. The apparatus of claim 1, wherein the coverage information further includes a cyclic redundancy check (CRC) scrambled with a power saving radio network temporary identifier (PS-RNTI) corresponding to the UE.

10. The apparatus of claim 1, wherein the processing system is further configured to:
    predict whether the UE needs coverage enhancement based on feedback from at least one other UE that uses a same transmission beam as the UE or a transmission beam neighboring the transmission beam used by the UE; and
    generate the wake-up signal based on the prediction that the UE needs the coverage enhancement.

11. The apparatus of claim 1, wherein the at least one downlink channel comprises a physical downlink control channel (PDCCH).

12. The apparatus of claim 1, further comprising at least one antenna via which the wake-up signal is transmitted to the UE, wherein the apparatus is configured as the BS.

13. An apparatus for wireless communication by a user equipment (UE), comprising:
an interface configured to obtain a wake-up signal indicating:
a first field including at least one wake-up indication bit associated with the UE; and
a second field including coverage information associated with at least one downlink channel, wherein the coverage information indicates a number of repetitions of the at least one downlink channel to receive; and
a processing system configured to monitor for the at least one downlink channel based, at least in part, on the coverage information.

14. The apparatus of claim 13, wherein the processing system is further configured to:
transition from a sleep state of a connected discontinuous reception (CDRX) mode to an awake state of the CDRX mode based on the at least one wake-up indication bit; and
monitor for the at least one downlink channel based on the coverage information during the awake state of the CDRX mode.

15. The apparatus of claim 13, wherein the coverage information includes at least one of:
an indication of one or more monitoring locations to monitor for the at least one downlink channel; or
an indication of a channel format change associated with the at least one downlink channel.

16. The apparatus of claim 13, wherein the second field further includes:
one or more cell dormancy indication bits for indicating whether a cell associated with the UE is in a dormant state; and
one or more additional bits for indicating the coverage information.

17. The apparatus of claim 13, wherein the second field includes one or more cell dormancy indication bits for indicating the coverage information.

18. The apparatus of claim 13, wherein the interface is further configured to obtain information for configuring repetition of the at least one downlink channel.

19. The apparatus of claim 18, wherein the coverage information includes at least one bit activating the repetition of the at least one downlink channel.

20. The apparatus of claim 19, wherein the processing system monitors for the at least one downlink channel by monitoring for one or more repetitions of the at least one downlink channel based on at least one of the information for configuring the repetition of the at least one downlink channel or the at least one bit activating the repetition of the at least one downlink channel.

21. The apparatus of claim 13, wherein the coverage information depends on at least one of:
a frequency range associated with the at least one downlink channel; or
a sub-carrier spacing associated with the at least one downlink channel.

22. The apparatus of claim 13, wherein the coverage information further includes a cyclic redundancy check (CRC) scrambled with a power saving radio network temporary identifier (PS-RNTI) corresponding to the UE.

23. The apparatus of claim 22, wherein the processing system is further configured to verify that the wake-up signal is intended for the UE based on the PS-RNTI.

24. The apparatus of claim 13, wherein the at least one downlink channel comprises a physical downlink control channel (PDCCH).

25. The apparatus of claim 13, further comprising at least one antenna via which the wake-up signal is obtained, wherein the apparatus is configured as the UE.

26. A method for wireless communications by a base station (BS), comprising:
generating a wake-up signal indicating:
a first field including at least one wake-up indication bit associated with a user equipment (UE); and
a second field including coverage information associated with at least one downlink channel, wherein the coverage information indicates a number of repetitions of the at least one downlink channel to receive; and
outputting the wake-up signal for transmission to the UE.

27. The method of claim 26, further comprising at least one of:
generating information for configuring repetition of the at least one downlink channel and outputting, for transmission to the UE, the information for configuring the repetition; or
predicting whether the UE needs coverage enhancement based on feedback from at least one other UE that uses a same transmission beam as the UE or a transmission beam neighboring the transmission beam used by the UE, wherein the wake-up signal is generated based on the prediction that the UE needs the coverage enhancement.

28. A method for wireless communication by a user equipment (UE), comprising:
obtaining a wake-up signal indicating:
a first field including at least one wake-up indication bit associated with the UE; and
a second field including coverage information associated with at least one downlink channel, wherein the coverage information indicates a number of repetitions of the at least one downlink channel to receive; and
monitoring for the at least one downlink channel based, at least in part, on the coverage information.

29. The method of claim 28, at least one of:
further comprising transitioning from a sleep state of a connected discontinuous reception (CDRX) mode to an awake state of the CDRX mode based on the at least one wake-up indication bit, wherein the at least one downlink channel is monitored during the awake state of the CDRX mode;
further comprising obtaining information for configuring repetition of the at least one downlink channel;
wherein the coverage information includes at least one bit activating the repetition of the at least one downlink channel; or
wherein the coverage information further includes a cyclic redundancy check (CRC) scrambled with a power saving radio network temporary identifier (PS-RNTI) corresponding to the UE.

30. The method of claim 29, at least one of:
wherein monitoring for the at least one downlink channel comprises monitoring for one or more repetitions of the at least one downlink channel based on at least one of the information for configuring the repetition of the at least one downlink channel or the at least one bit activating the repetition of the at least one downlink channel; or further comprising verifying that the wake-up signal is intended for the UE based on the PS-RNTI.

* * * * *